United States Patent
Nyberg et al.

(10) Patent No.: US 6,298,011 B1
(45) Date of Patent: Oct. 2, 2001

(54) METHOD FOR KILLING MOSQUITO LARVAE

(76) Inventors: Michael H. Nyberg; Herbert J. Nyberg, both of 6 Hawthorne Rd., Old Lyme, CT (US) 06371

(*) Notice: Subject to any disclaimer, the term of this patent is extended or adjusted under 35 U.S.C. 154(b) by 0 days.

(21) Appl. No.: 09/753,820

(22) Filed: Jan. 3, 2001

(51) Int. Cl.[7] .................................................. A01M 1/00
(52) U.S. Cl. ....................................................... 367/139
(58) Field of Search .......................... 367/139; 116/22 A; 43/132.1

(56) References Cited

U.S. PATENT DOCUMENTS

| 4,284,845 | 8/1981 | Belcher . |
| 4,484,316 | 11/1984 | Nakagawa . |
| 5,241,778 | 9/1993 | Price . |
| 5,528,049 | 6/1996 | Callahan . |

FOREIGN PATENT DOCUMENTS

| 11-561963 | * | 3/1999 | (JP) . |
| 2000-570401-A | * | 8/2000 | (JP) . |

* cited by examiner

*Primary Examiner*—Ian J. Lobo
(74) *Attorney, Agent, or Firm*—Bachman & LaPointe, P.C.

(57) ABSTRACT

Mosquito larvae in a body of water are subjected to acoustic resonance or cavitation from an acoustic transducer immersed in the body of water, resulting in killing the adjacent mosquito larvae.

10 Claims, 3 Drawing Sheets

METHOD FOR KILLING MOSQUITO LARVAE

BACKGROUND OF THE INVENTION

Mosquito infestation has become more prevalent and is particularly bothersome in wetland areas. This has been seen to represent a particular problem in view of the health risks often posed by mosquitos. For example, diseases which are fatal to mankind are now being transmitted by mosquito bites.

Devices and methods for trapping and killing mosquitos are well known in the art, but these are generally either ineffective or subject to various problems. For example, current methods for elimination of mosquitos may employ aerial spraying of pesticides over large areas, as over wetlands. However, while these methods may be effective the procedure is expensive and can often be harmful to humans and other species. Also, aerial sprays tend to migrate and affect areas other than that which is originally intended. Moreover, these can be quite harmful to the environment. Other methods exist, such as electric insect killers and the like, which are not entirely effective. Personal sprays are of limited effectiveness and are also subject to environmental concerns.

Thus, although a great deal of effort is expended annually by individuals, groups and municipalities to control the high mosquito population, these efforts have been seen to have limited benefits and may themselves cause problems. As increased emphasis is placed on outdoor recreation, more effective measures are needed to control the mosquito population, particularly since they can carry a variety of diseases.

Therefore, it is a principal object of the present invention to provide a simple, convenient and expeditious method of controlling the mosquito population.

It is a further object of the present invention to provide a method as aforesaid which inexpensively kills mosquito larvae, thus effectively controlling the mosquito population.

A still further object of the present invention is to provide a method as aforesaid which is essentially free from hazards and adverse side effects.

Further objects and advantages of the present invention will appear hereinbelow.

SUMMARY OF THE INVENTION

It has now been found that the foregoing objects and advantages can be readily obtained in accordance with the method of the present invention.

The present invention provides a method for killing mosquito larvae, which comprises: subjecting mosquito larvae in a body of water to one of cavitation and acoustic resonance with structures within the mosquito larvae from an acoustic transducer, resulting in killing adjacent mosquito larvae. The acoustic transducer is immersed in a body of water containing mosquito larvae. In preferred embodiments, the acoustic transducer is energized resulting in acoustic resonance of the larval air bladder or cavitation. In acoustic resonance, the resonant frequency of the air bladder is from 16 kHz to 32 kHz with less than 1 watt of energy required to start the process. Desirably, the transducer is moved across the body of water as by a boat to affect different areas of the body of water as needed. Alternately, transducers can be dipped in storm catch basins, installed permanently in small bodies of water, such as ponds, or installed in backpack units for operators who wade through marsh areas, etc. Preferably, an amplifier is connected to said transducer.

It has been found that the foregoing method is effective in killing mosquito larvae.

Further features of the present invention will appear hereinbelow.

BRIEF DESCRIPTION OF THE DRAWINGS

The present invention will be more readily understandable from a consideration of the accompanying illustrative drawings, wherein.

DETAILED DESCRIPTION OF PREFERRED EMBODIMENTS

In accordance with the present invention, mosquito larvae are simply and inexpensively eliminated over wide wetland areas prior to their emerging as mosquitos that have the potential to bring disease to humans and animals. The procedure of the present invention does not use harmful pesticides and is relatively inexpensive.

Mosquito larvae have internal organs which contain various structures, including a small air bladder. All structures have acoustic resonance, especially underwater bubbles. Since larvae tissues are fragile, simply matching the acoustic resonance of the air bladder causes acute trauma and embolism resulting in death of the mosquito larvae.

Figure 1:
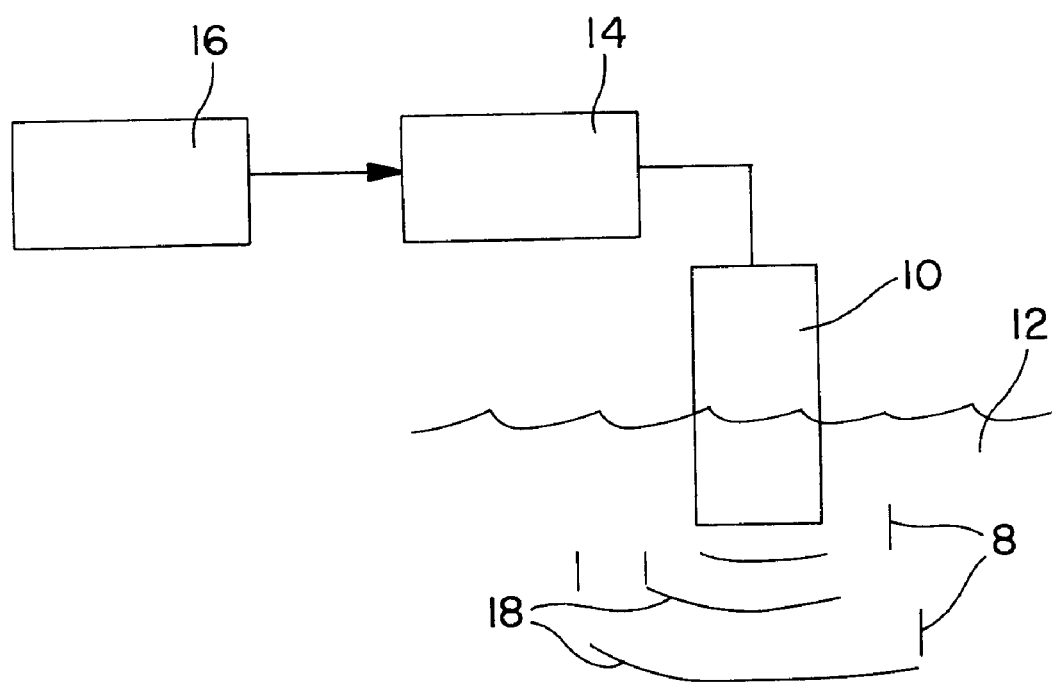
FIG. 1 is a partly schematic view of the method of the present invention with acoustic resonance.

Thus, referring to FIG. 1, an acoustic transducer 10 is immersed in a body of water 12 which is a habitat for mosquito larvae 8. A depth of immersion of only a few inches is required, as shown in FIG. 1. One or more transducer 10 is preferably connected to an amplifier 14 which in turn is connected to a signal generator 16 for generating a resonant frequency within an octave range ranging from 16 kHz to 32 kHz. The transducer 10 immersed in water 12 is energized for a short period of time. The resultant acoustic resonance shown by lines 18 resonates with the air bladder of the mosquito larvae 8, causing it to traumatize surrounding tissue and causes the air bubble to migrate from the thorax of the mosquito through the abdomen, resulting in death to the larvae. An effective resonant frequency is from 16 kHz to 32 kHz, and less than one watt of energy is necessary to start the process. A larger signal generator would be necessary to cover a larger body of water with rapid coverage, or the unit could be effectively moved to various locations in the body of water.

Figure 2:
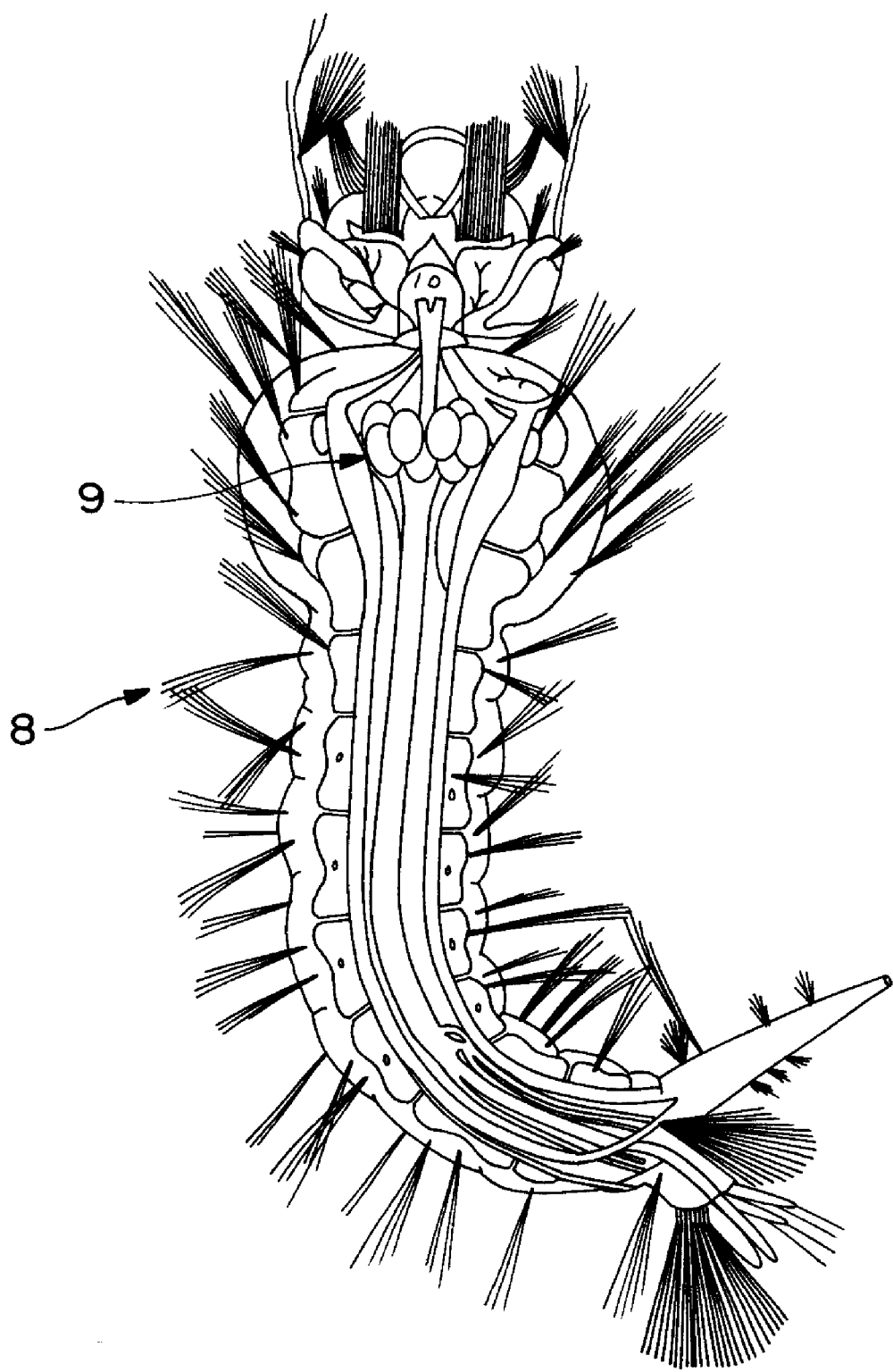
FIG. 2 is a partly schematic view of the method of the present invention with cavitation.

FIG. 2 shows a diagram of a mosquito larvae 8 with air bladder 9 therein which is traumatized by the acoustic resonance referred to above.

Figure 3:
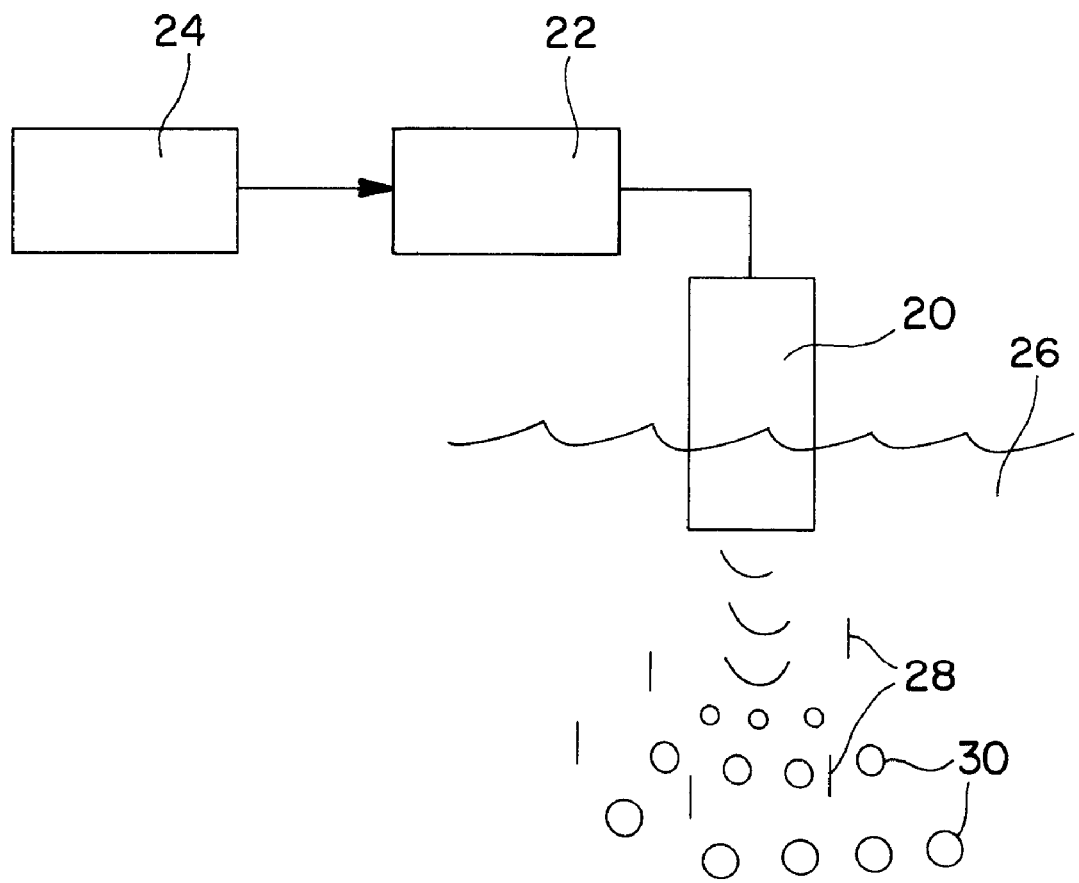
FIG. 3 is a diagram of a mosquito larvae.

In the alternate embodiment shown in FIG. 3, one or more transducer 20 connected to amplifier 22 which in turn is connected to signal generator 24 is immersed in a body of water 26 known to be a habitat for mosquito larvae 28. The transducer need only be immersed in a few inches of the water and, as with FIG. 1, can be mounted to a small boat and moved across the water. The transducers are then energized to an acoustic level to begin cavitation as shown at 30. The resultant turbulence will cause death to adjacent mosquito larvae.

The cavitation is independent of frequency for a given transducer. Cavitation will result from energizing a given transducer. Cavitation only affects a discrete area, as for example no more than two feet; however, acoustic resonance from an acoustic transducer affects a wider field. For example, a 100 watt transducer can affect an area with a radius of about 80 feet. Naturally, this will vary depending on conditions.

Surprisingly, the acoustic resonance and/or cavitation causes death to adjacent mosquito larvae and does this in a simple and environmentally friendly manner.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Method for killing mosquito larvae, which comprises: subjecting mosquito larvae in a body of water to acoustic resonance from an acoustic transducer, including immersing the acoustic transducer in a body of water containing mosquito larvae, energizing the acoustic transducer resulting in a resonant frequency in the body of water, wherein said resonant frequency resonates with the air bladder of the mosquito larvae, traumatizing surrounding tissue and resulting in death of the adjacent mosquito larvae.

2. Method according to claim 1, including the step of moving the transducer to different areas of said body of water.

3. Method according to claim 1, including the step of generating a resonant frequency from 16 kHz to 32 kHz.

4. Method according to claim 3, including the step of employing less than 1 watt to start the method.

5. Method according to claim 1, including the step of connecting an amplifier to said transducer.

6. Method according to claim 5, including connecting a signal generator to said transducer.

7. Method according to claim 1, including immersing the acoustic transducer in one of a catch basin, a pond and a marsh area.

8. Method according to claim 1, including killing adjacent mosquito larvae up to a radius of about 80 feet.

9. Method according to claim 1, including the step of matching the resonant frequency of the transducer with the acoustic resonance of the air bladder, resulting in death of the adjacent mosquito larvae.

10. Method according to claim 1, including the step of generating a resonant frequency which resonates with the air bladder of the larvae.

* * * * *